(12) United States Patent
Wu

(10) Patent No.: US 10,212,891 B1
(45) Date of Patent: Feb. 26, 2019

(54) GARDENING SHEAR

(71) Applicant: Shih-Piao Wu, Changhua (TW)

(72) Inventor: Shih-Piao Wu, Changhua (TW)

(73) Assignee: Jiin Haur Industrial Co. Ltd., Changhua (TW)

( * ) Notice: Subject to any disclaimer, the term of this patent is extended or adjusted under 35 U.S.C. 154(b) by 0 days.

(21) Appl. No.: 15/895,281

(22) Filed: Feb. 13, 2018

(51) Int. Cl.
*A01G 3/02* (2006.01)
*A01G 3/025* (2006.01)

(52) U.S. Cl.
CPC ............ *A01G 3/021* (2013.01); *A01G 3/0251* (2013.01)

(58) Field of Classification Search
CPC ........ A01G 3/02; A01G 3/021; A01G 3/0251; A01G 3/0475; B26B 13/26
USPC .......... 30/245, 251, 254–262, 192, 193, 266
See application file for complete search history.

(56) References Cited

U.S. PATENT DOCUMENTS

| | | | | |
|---|---|---|---|---|
| 5,839,195 A * | 11/1998 | Lin | ....................... | A01G 3/0251 30/250 |
| 6,345,446 B1 * | 2/2002 | Huang | ................. | A01G 3/0251 30/192 |
| 8,225,513 B2 * | 7/2012 | Huang | ...................... | A01G 3/02 30/190 |
| 8,327,549 B2 * | 12/2012 | Huang | ..................... | B26B 13/26 30/190 |
| 8,572,853 B2 * | 11/2013 | Huang | ................. | A01G 3/0251 30/239 |
| 8,661,691 B2 * | 3/2014 | Huang | ................. | A01G 3/0251 30/245 |
| 2009/0044412 A1 * | 2/2009 | Hsieh | ................... | A01G 3/0251 30/252 |

FOREIGN PATENT DOCUMENTS

| | | | | |
|---|---|---|---|---|
| DE | 29708232 U1 * | 7/1997 | ........... | A01G 3/0251 |
| DE | 20000866 U1 * | 4/2000 | ........... | A01G 3/0251 |
| GB | 2358338 A * | 7/2001 | ............. | A01G 3/025 |

\* cited by examiner

*Primary Examiner* — Laura M Lee

(74) *Attorney, Agent, or Firm* — Che-Yang Chen; Law Offices of Scott Warmuth

(57) ABSTRACT

A gardening shear may comprise a first blade, a second blade, a first handle, and a second handle. By using leverage principle, a user can use the gardening shear of the present invention to easily cut limbs or branches of plant, which is labor-saving. Moreover, the gardening shear of the present invention is simple in structure, which saves time and effort in assembly and lowers costs of manufacture.

8 Claims, 5 Drawing Sheets

GARDENING SHEAR

FIELD OF THE INVENTION

The present invention relates to a gardening shear and more particularly to a labor-saving gardening shear.

BACKGROUND OF THE INVENTION

Generally, a conventional gardening shear comprises a pair of blades to cut and trim parts of plant which include limbs, branches and twigs.

However, the conventional gardening shear is disadvantageous because: some limbs or branches are thick that a user needs to take great strength to operate the gardening shear; and (ii) although there are some labor-saving gardening shears in the market, the structures thereof are always complicated, which leads to more costs and effort for manufacture. Therefore, there remains a need for a new and improved design for a gardening shear to overcome the problems presented above.

SUMMARY OF THE INVENTION

The present invention provides a gardening shear which comprises a first blade, a second blade, a first handle, and a second handle. The first blade has a first cutting portion, and a first through hole and a second through hole respectively penetrate a middle portion and a lower portion of the first blade. The second through hole is located adjacent to one lateral side of the lower portion of the first blade, and a pivot portion laterally protruding from the other lateral side of the lower portion of the first blade has a third through hole thereon. Moreover, the pivot portion and the first cutting portion are positioned at the same lateral side of the first blade. The second blade comprises a second cutting portion, and a fourth through hole penetrating through a middle portion of the second blade is located at a position corresponding to the first through hole of the first blade. When the first blade and the second blade are coupled together, the first through hole and the fourth through hole are adapted to be aligned to enable a pivot member to pass therethrough so as to pivotally connect the first blade with the second blade. Furthermore, a protruding edge protruding from an edge of the middle portion of the second blade is located adjacent to the fourth through hole, and a fifth through hole penetrates through the protruding edge. Additionally, a lower portion of the second blade has an arm, and a sixth through hole penetrating through the arm is located adjacent to a lower edge of the second blade. The first handle is a long pole, and an upper portion thereof has a first connecting section. Also, a seventh through hole and a first elongated hole respectively penetrate through the first connecting section. The seventh through hole and the first elongated hole are configured to respectively be aligned with the second through hole of the first blade and the sixth through hole of the second blade, and a connecting member is adapted to penetrate through the seventh through hole and the second through hole while another pivot member is configured to penetrate through the first elongated hole and the sixth through hole to pivotally connect the first handle with the first blade and the second blade. In addition, a first rolling member is disposed on the pivot member which penetrates through the first elongated hole, and the first rolling member is configured to roll and shift along the first elongated hole so as to enable the first handle to drive and open/close the first blade and the second blade. Similarly, the second handle is a long pole, and an upper portion thereof has a second connecting section. Also, an eighth through hole and a second elongated hole respectively penetrate through the second connecting section. The eighth through hole and the second elongated hole are configured to respectively aligned with the fifth through hole of the second blade and the third through hole of the first blade, and another connecting member is adapted to penetrate through the eighth through hole and the fifth through hole while a third pivot member is configured to penetrate through the second elongated hole and the third through hole to pivotally connect the second handle with the first blade and the second blade. Additionally, a second rolling member is disposed on the pivot member which penetrates through the second elongated hole, and the second rolling member is configured to roll and shift along the second elongated hole so as to enable the second handle to drive and open/close the first blade and the second blade.

Comparing with conventional gardening shear, the present invention is advantageous because: (i) by using leverage principle, a user can use the gardening shear of the present invention to easily cut limbs or branches of plant, which is labor-saving; and (ii) the gardening shear of the present invention is simple in structure, which saves time and effort in assembly and lowers costs of manufacture.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
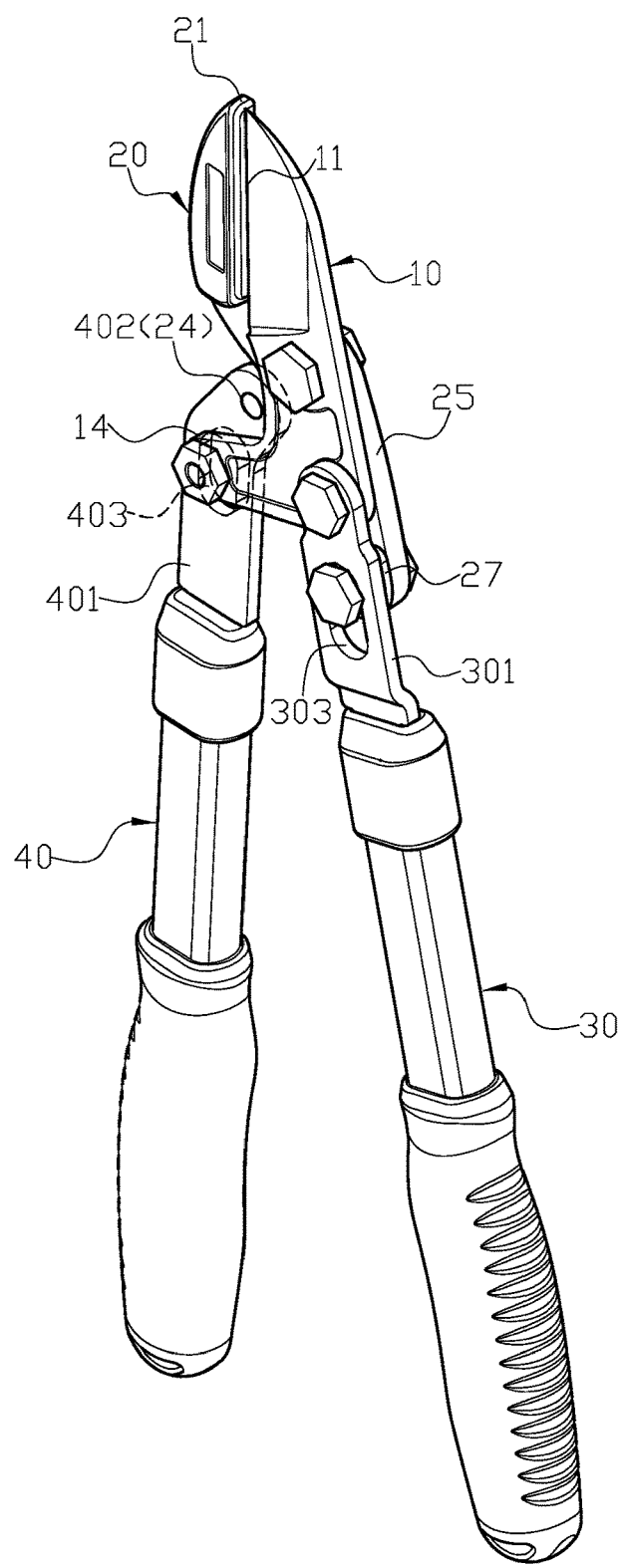
FIG. 1 is a three-dimensional assembly view of a gardening shear of the present invention.
Figure 2:
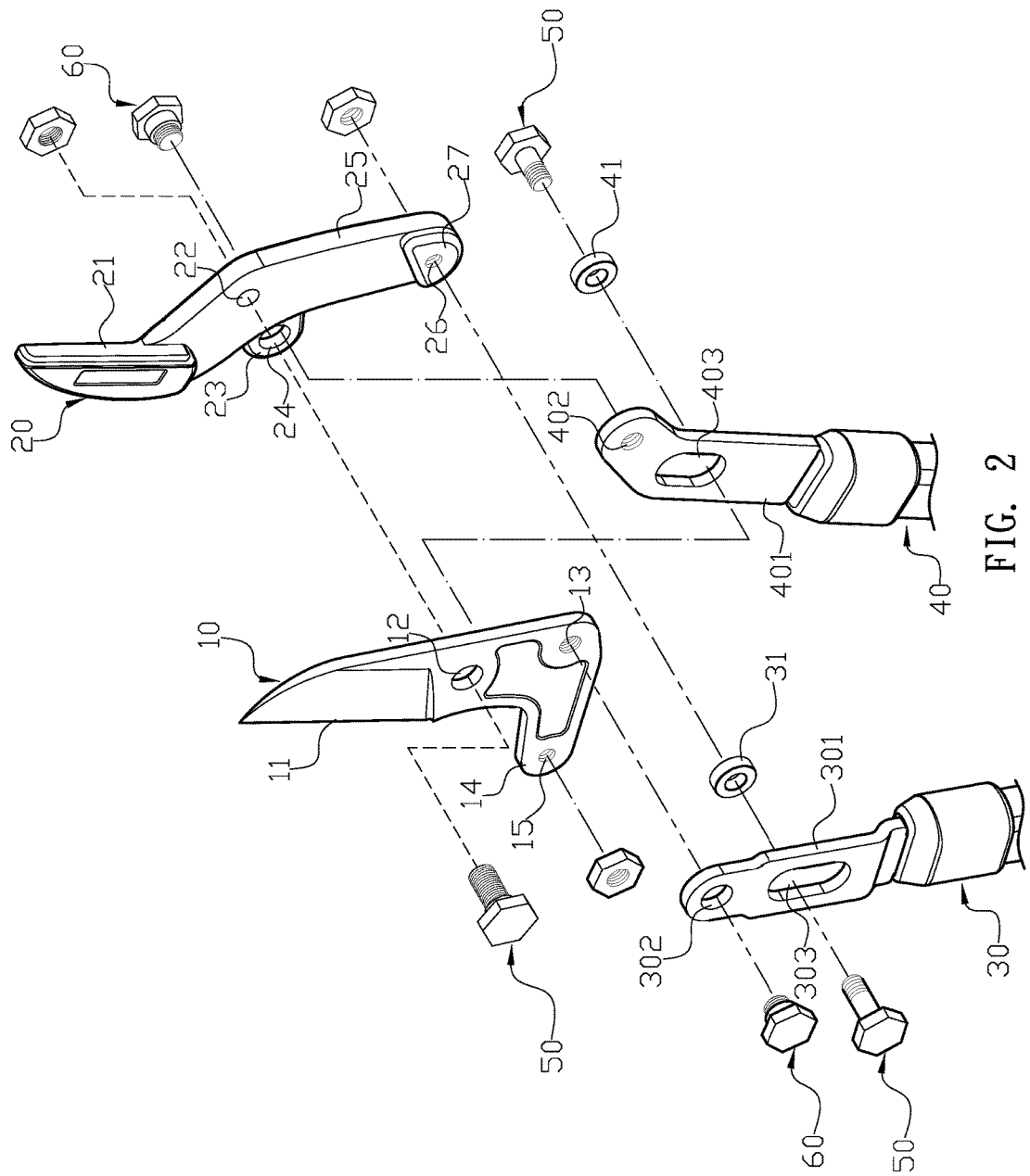
FIG. 2 is a three-dimensional exploded view of the gardening shear of the present invention.
Figure 3:
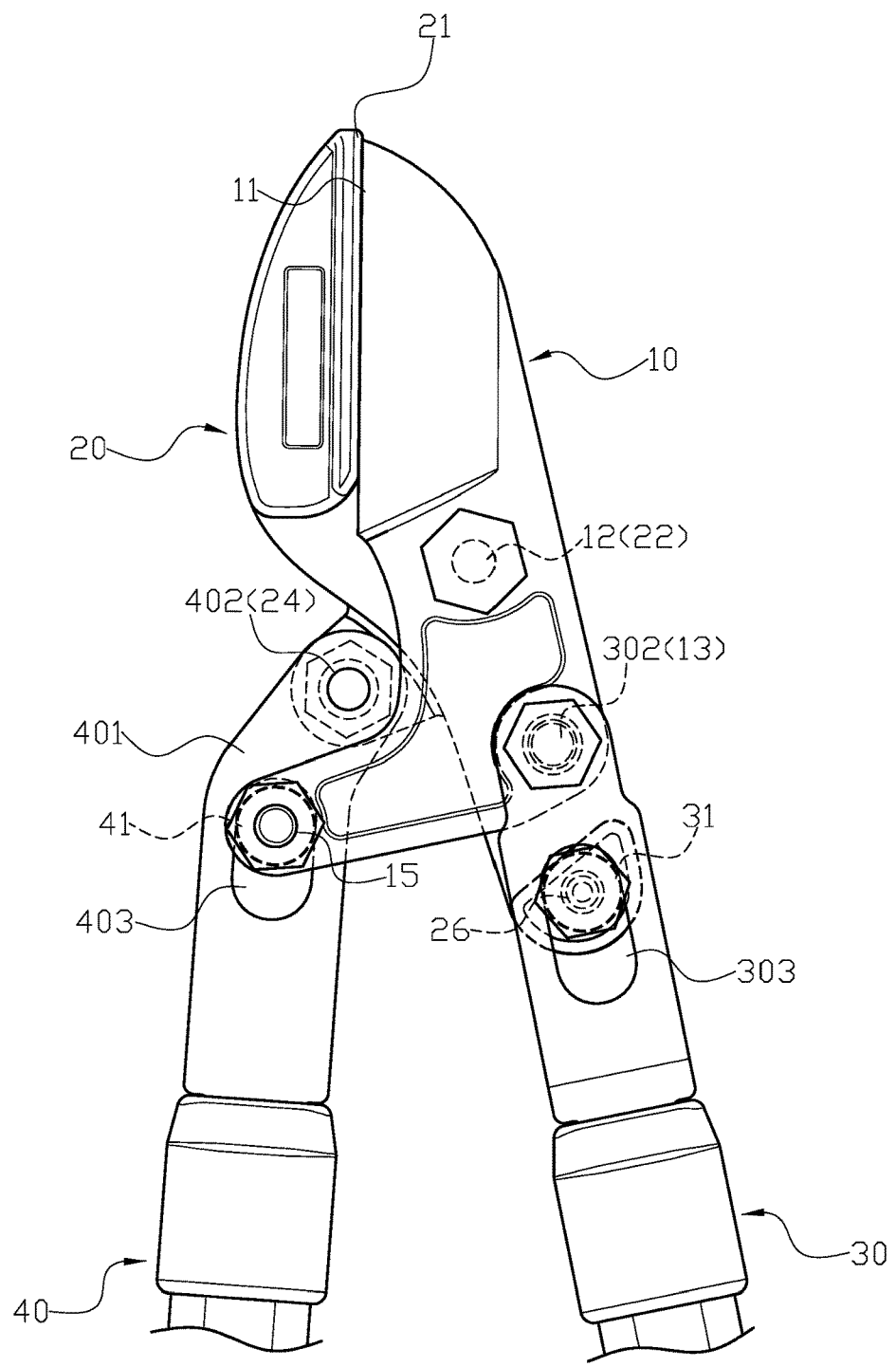
FIG. 3 is an assembly plan view of the gardening shear of the present invention.

In order to further understand the goal, characteristics and effect of the present invention, a number of embodiments along with the drawings are illustrated as following:

Referring to FIGS. 1 to 3, the present invention provides a gardening shear which comprises a first blade (10), a second blade (20), a first handle (30), and a second handle (40). The first blade (10) has a first cutting portion (11), and a first through hole (12) and a second through hole (13) respectively penetrate a middle portion and a lower portion of the first blade (10). The second through hole (13) is located adjacent to one lateral side of the lower portion of the first blade (10), and a pivot portion (14) laterally protruding from the other lateral side of the lower portion of the first blade (10) has a third through hole (15) thereon. Moreover, the pivot portion (14) and the first cutting portion (11) are positioned at the same lateral side of the first blade (10). The second blade (20) comprises a second cutting portion (21), and a fourth through hole (22) penetrating through a middle portion of the second blade (20) is located at a position corresponding to the first through hole (12) of the first blade (10). When the first blade (10) and the second blade (20) are coupled together, the first through hole (12) and the fourth through hole (22) are adapted to be aligned to enable a pivot member (50) to pass therethrough so as to pivotally connect the first blade (10) with the second blade (20). Furthermore, a protruding edge (23) protruding from an edge of the middle portion of the second blade (20) is located adjacent to the fourth through hole (22), and a fifth through hole (24) penetrates through the protruding edge (23). Additionally, a lower portion of the second blade (20) has an arm (25), and a sixth through hole (26) penetrating through the arm (25) is located adjacent to a lower edge of the second blade (20). The first handle (30) is a long pole, and an upper portion thereof has a first connecting section (301). Also, a seventh through hole (302) and a first elongated hole (303) respectively penetrate through the first connecting section (301). The seventh through hole (302) and the first elongated hole (303) are configured to respectively be aligned with the second through hole (13) of the first blade (10) and the sixth through hole (26) of the second blade (20), and a connecting member (60) is adapted to penetrate through the seventh through hole (302) and the second through hole (13) while another pivot member (50) is configured to penetrate through the first elongated hole (303) and the sixth through hole (26) to pivotally connect the first handle (30) with the first blade (10) and the second blade (20). In addition, a first rolling member (31) is disposed on the pivot member (50) which penetrates through the first elongated hole (303), and the first rolling member (31) is configured to roll and shift along the first elongated hole (303) so as to enable the first handle (30) to drive and open/close the first blade (10) and the second blade (20). Similarly, the second handle (40) is a long pole, and an upper portion thereof has a second connecting section (401). Also, an eighth through hole (402) and a second elongated hole (403) respectively penetrate through the second connecting section (401). The eighth through hole (402) and the second elongated hole (403) are configured to respectively aligned with the fifth through hole (24) of the second blade (20) and the third through hole (15) of the first blade (10), and another connecting member (60) is adapted to penetrate through the eighth through hole (402) and the fifth through hole (24) while a third pivot member (50) is configured to penetrate through the second elongated hole (403) and the third through hole (15) to pivotally connect the second handle (40) with the first blade (10) and the second blade (20). Additionally, a second rolling member (41) is disposed on the pivot member (50) which penetrates through the second elongated hole (403), and the second rolling member (41) is configured to roll and shift along the second elongated hole (403) so as to enable the second handle (40) to drive and open/close the first blade (10) and the second blade (20).

In one embodiment, the first cutting portion (11) is a cutting edge, and the second cutting portion (21) is a blade anvil.

In another embodiment, the second cutting portion (21) and the arm (25) are extended obliquely from the middle portion of the second blade (20) toward two opposite directions.

In still another embodiment, the second blade (20) has a protruding portion (27) at a position corresponding to the sixth through hole (26), and the protruding portion (27) is configured to separate a distance between the lower portion of the second blade (20) and the first connecting section (301).

In a further embodiment, the first connecting section (301) is a flat plate body which is extended from an upper end of the first handle (30), and the first connecting section (301) has two consecutive bending sections to horizontally shift a portion of the first connecting section (301) above the bending sections to a side of the first handle (30).

In still a further embodiment, the second connecting section (401) is a flat plate body which is extended from an upper end of the second handle (40).

In a particular embodiment, each of the pivot members (50) is a bolt cooperating with a nut.

In a preferred embodiment, the connecting member (60) is a bolt and the second through hole (13) is a screw hole such that the connecting member (60) is configured to pass through the seventh through hole (302) to engage with the second through hole (13).

In another preferred embodiment, the connecting member (60) is a bolt and the eighth through hole (402) is a screw hole such that the connecting member (60) is configured to pass through the fifth through hole (24) to engage with the eighth through hole (402).

Figure 4:
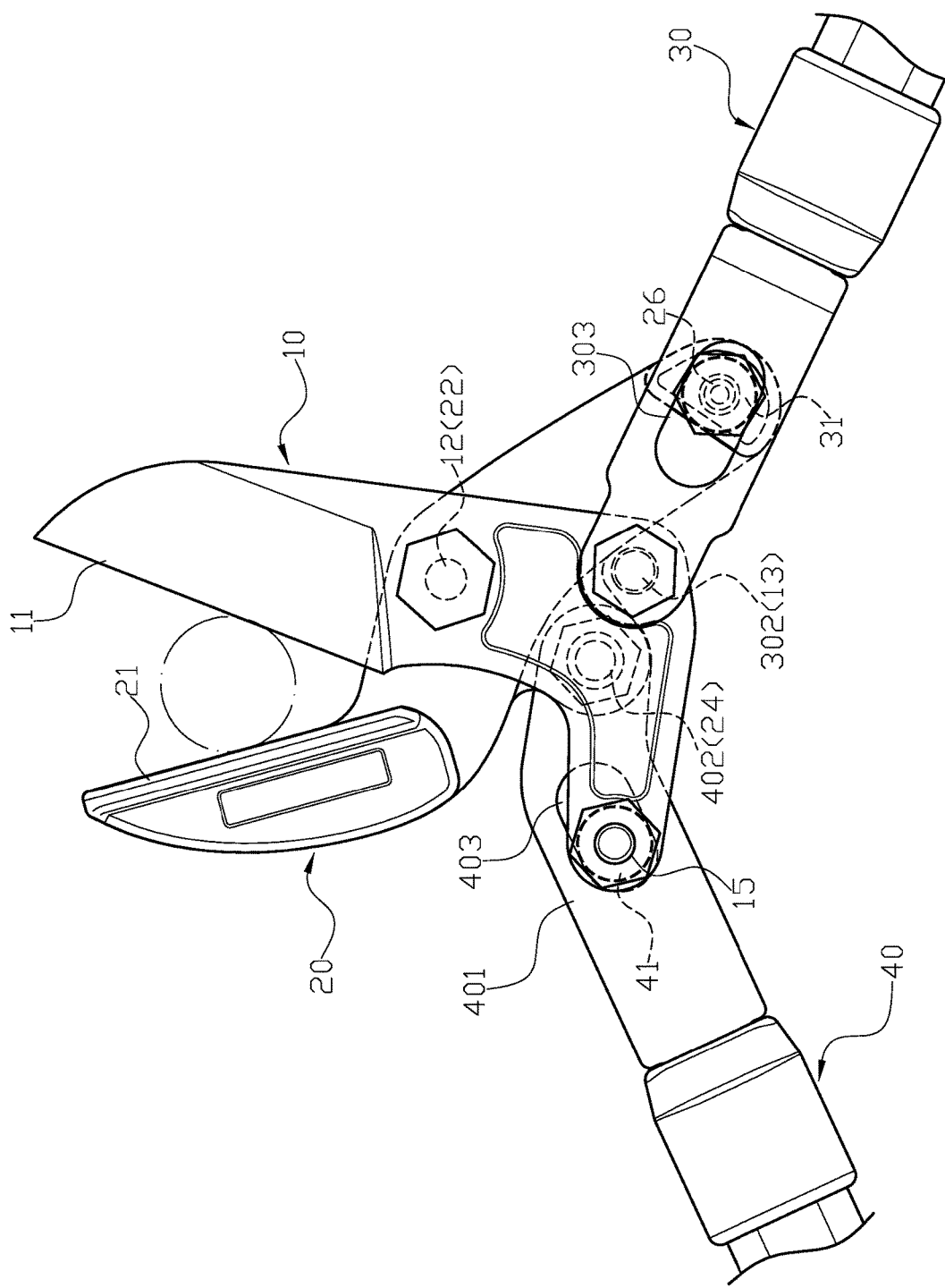
FIG. 4 is a schematic view of the gardening shear of the present invention when a pair of blades thereof is opened.
Figure 5:
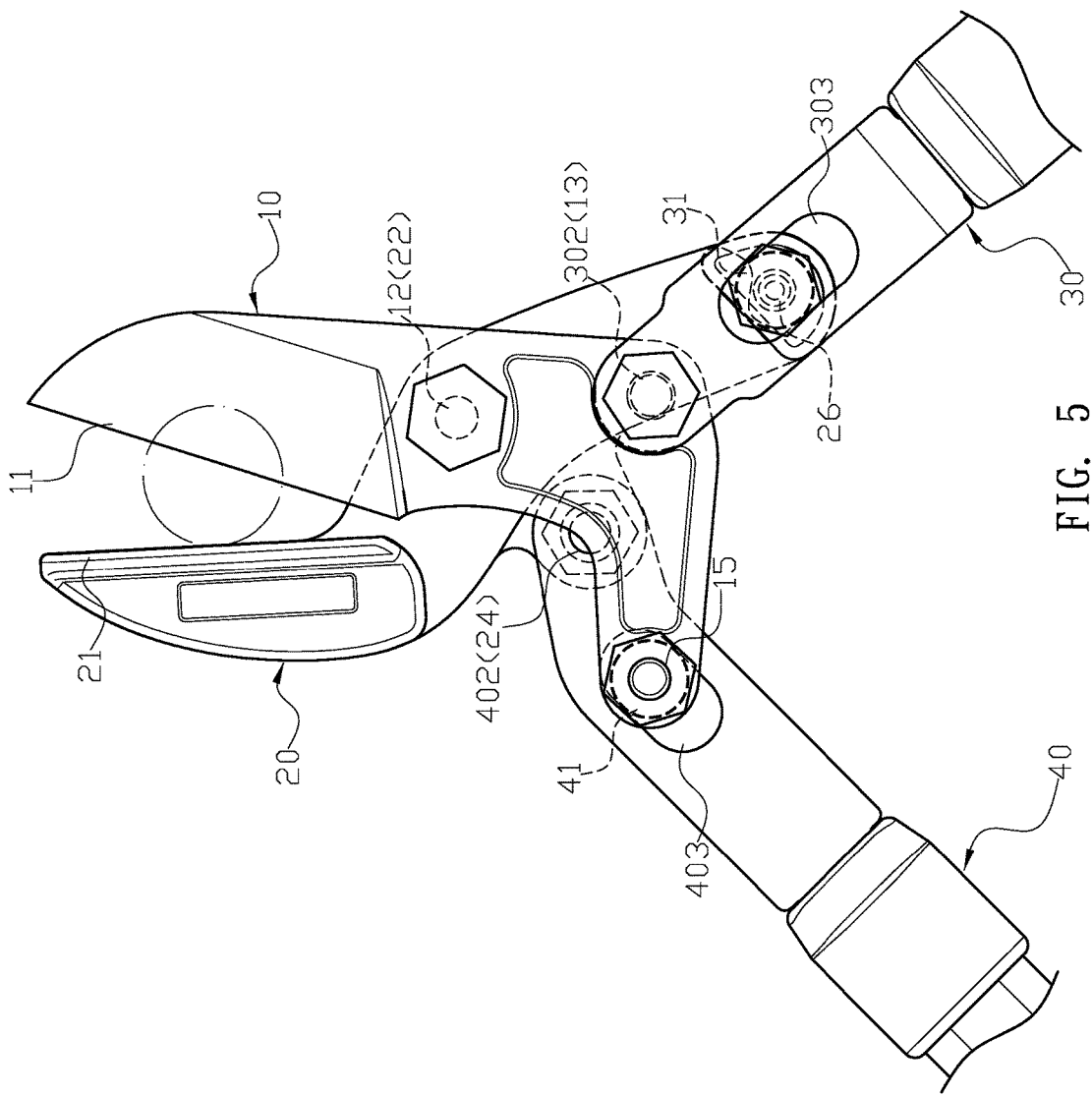
FIG. 5 is a schematic view illustrating the gardening shear of the present invention is operated for cutting plants.

Referring to FIGS. 4 and 5, in actual application, by taking the first through hole (12) and the fourth through hole (22) as a pivot point, the first handle (30) and the second handle (40) are operated to drive the first blade (10) and the second blade (20) to cut plants. In the cutting action, the first handle (30) and the second handle (40) are lever arms, and the first rolling member (31) and the second rolling member (41) are movable pivots. Moreover, the second through hole (13) and the fifth through hole (24) are resistance points. When a user presses the first handle (30) and the second handle (40) inwardly to cut plants, the first rolling member (31) and the second rolling member (41) are configured to move toward the two resistance points respectively such that the resistance arms are shorten, which enables the cutting action more labor-saving.

Comparing with conventional gardening shear, the present invention is advantageous because: (i) by using leverage principle, a user can use the gardening shear of the present invention to easily cut limbs or branches of plant, which is labor-saving; and (ii) the gardening shear of the present invention is simple in structure, which saves time and effort in assembly and lowers costs of manufacture.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A gardening shear comprising a first blade, a second blade, a first handle, and a second handle,
    wherein the first blade has a first cutting portion, and a first through hole and a second through hole respectively penetrate a middle portion and a lower portion of the first blade; the second through hole is located adjacent to one lateral side of the lower portion of the first blade, and a pivot portion laterally protruding from the other lateral side of the lower portion of the first blade has a third through hole thereon; the pivot portion and the first cutting portion are positioned at the same lateral side of the first blade;
    wherein the second blade comprises a second cutting portion, and a fourth through hole penetrating through a middle portion of the second blade is located at a position corresponding to the first through hole of the first blade; when the first blade and the second blade are coupled together, the first through hole and the fourth through hole are adapted to be aligned to enable a first pivot member to pass therethrough so as to pivotally connect the first blade with the second blade; a protruding edge protruding from an edge of the middle portion of the second blade is located adjacent to the fourth through hole, and a fifth through hole penetrates through the protruding edge; a lower portion of the second blade has an arm, and a sixth through hole penetrating through the arm is located adjacent to a lower edge of the second blade;
    wherein the first handle is a long pole, and an upper portion thereof has a first connecting section; a seventh through hole and a first elongated hole respectively penetrate through the first connecting section; the seventh through hole and the first elongated hole are configured to respectively be aligned with the second through hole of the first blade and the sixth through hole of the second blade, and a first connecting member is adapted to penetrate through the seventh through hole and the second through hole while a second pivot member is configured to penetrate through the first elongated hole and the sixth through hole to pivotally connect the first handle with the first blade and the second blade; a first rolling member is disposed on the second pivot member which penetrates through the first elongated hole, and the first rolling member is configured to roll and shift along the first elongated hole so as to enable the first handle to drive and open/close the first blade and the second blade; and
    wherein the second handle is a long pole, and an upper portion thereof has a second connecting section; an eighth through hole and a second elongated hole respectively penetrate through the second connecting section; the eighth through hole and the second elongated hole are configured to be respectively aligned with the fifth through hole of the second blade and the third through hole of the first blade, and a second connecting member is adapted to penetrate through the eighth through hole and the fifth through hole while a third pivot member is configured to penetrate through the second elongated hole and the third through hole to pivotally connect the second handle with the first blade and the second blade; a second rolling member is disposed on the third pivot member which penetrates through the second elongated hole, and the second rolling member is configured to roll and shift along the second elongated hole so as to enable the second handle to drive and open/close the first blade and the second blade.

2. The gardening shear of claim 1, wherein the first cutting portion is a cutting edge, and the second cutting portion is a blade anvil.

3. The gardening shear of claim 1, wherein the second blade has a protruding portion at a position corresponding to the sixth through hole, and the protruding portion is configured to separate a distance between the lower portion of the second blade and the first connecting section.

4. The gardening shear of claim 1, wherein the first connecting section is a flat plate body which is extended from an upper end of the first handle, and the first connecting section has two consecutive bending sections to horizontally shift a portion of the first connecting section above the bending sections to a side of the first handle.

5. The gardening shear of claim 1, wherein the second connecting section is a flat plate body which is extended from an upper end of the second handle.

6. The gardening shear of claim 1, wherein each of the first pivot member, the second pivot member and the third pivot member is a bolt cooperating with a nut.

7. The gardening shear of claim 1, wherein the first connecting member is a bolt and the second through hole is a screw hole such that the first connecting member is configured to pass through the seventh through hole to engage with the second through hole.

8. The gardening shear of claim 1, wherein the second connecting member is a bolt and the eighth through hole is a screw hole such that the second connecting member is configured to pass through the fifth through hole to engage with the eighth through hole.

* * * * *